United States Patent [19]

Meyers et al.

[11] Patent Number: 4,951,914
[45] Date of Patent: * Aug. 28, 1990

[54] PIPE SEAL ASSEMBLY FOR POURED CONCRETE ON-SITE WASTE DISPOSAL SYSTEM COMPONENTS

[75] Inventors: Theodore W. Meyers, Inverness, Ill.; Steven R. Shelton, Provo, Utah

[73] Assignee: Tuf-Tite, Inc., Barrington, Ill.

[*] Notice: The portion of the term of this patent subsequent to May 5, 2004 has been disclaimed.

[21] Appl. No.: 276,220

[22] Filed: Nov. 23, 1988

Related U.S. Application Data

[63] Continuation-in-part of Ser. No. 46,461, May 4, 1987, abandoned.

[51] Int. Cl.$^5$ ............................................. E02D 29/16
[52] U.S. Cl. ....................................... 249/11; 220/3.4; 249/39; 249/52; 249/91; 249/177; 277/207 A
[58] Field of Search ................... 220/3, 4; 249/10, 11, 249/39, 52, 91, 93, 94, 177; 277/58, 207 A

[56] References Cited

U.S. PATENT DOCUMENTS

| | | | |
|---|---|---|---|
| 3,516,679 | 6/1970 | Schmitt | 277/58 |
| 3,796,406 | 3/1974 | Ditcher | 249/11 |
| 3,857,589 | 12/1974 | Oostenbrink | 277/207 A |
| 4,103,901 | 8/1978 | Ditcher | 277/207 A |
| 4,350,351 | 9/1982 | Martin | 277/207 A |
| 4,508,355 | 4/1985 | Ditcher | 277/207 A |
| 4,625,976 | 12/1986 | Gilbert | 277/207 A |
| 4,663,036 | 5/1987 | Strobl, Jr. et al. | 210/532.2 |
| 4,732,397 | 3/1988 | Gavin | 277/207 A |
| 4,744,571 | 5/1988 | Geberth, Jr. | 277/208 |
| 4,805,920 | 2/1989 | Gavin | 277/207 A |
| 4,809,994 | 3/1989 | Skinner et al. | 277/207 A |

Primary Examiner—Jay H. Woo
Assistant Examiner—C. Scott Bushey
Attorney, Agent, or Firm—Tilton, Fallon, Lungmus & Chestnut

[57] ABSTRACT

A pipe seal assembly for a poured concrete tank or box in an on-site waste disposal system including a seal member having an inclined inner wiper flange which releasably retains a mandrel, and plug means also releasably mounted within the seal member to prevent ingress of liquid concrete during box formation. A spacer member is provided for those instances where the seal member is to be installed in the wall of a relatively thick-walled concrete box. Alternate means for releasably retaining the seal member to the mandrel are disclosed. Additionally, a series of such seal assemblies is disclosed for use in sealably attaching a pipe through a thick poured concrete wall, such as a basement wall.

11 Claims, 5 Drawing Sheets

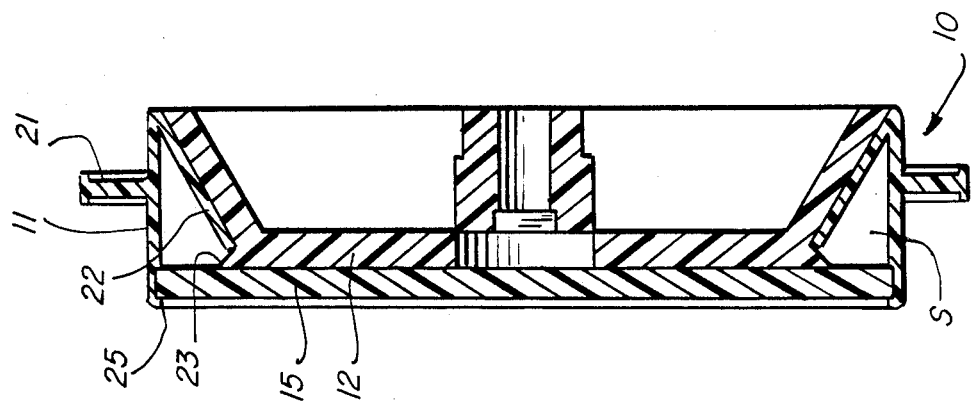
FIG. 5
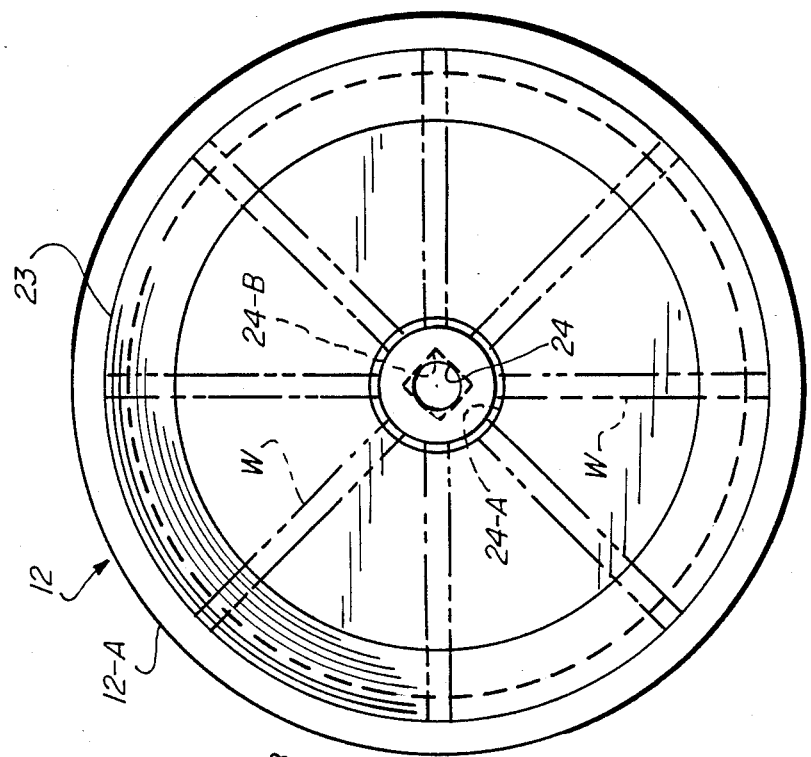
FIG. 4
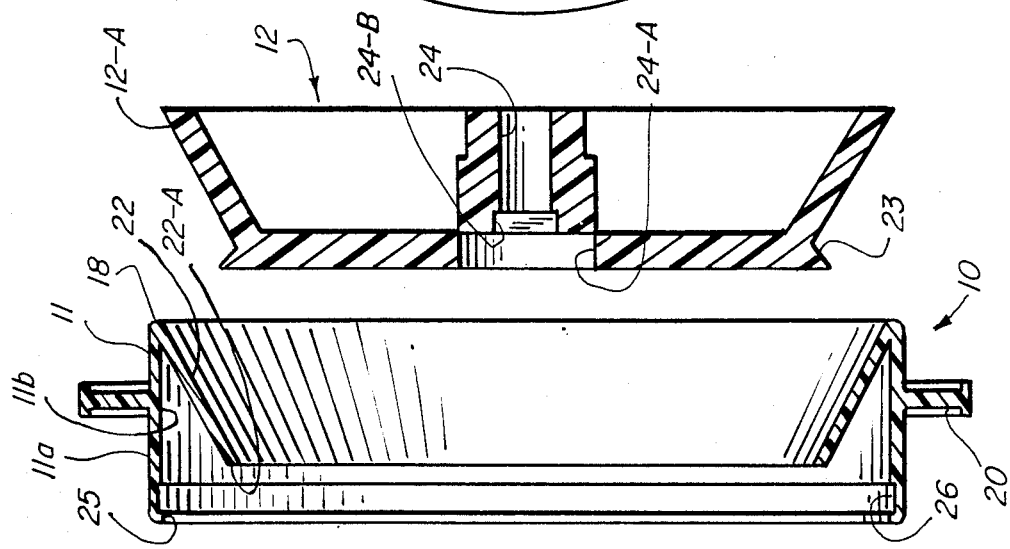
FIG. 3
FIG. 2

4,951,914

1

PIPE SEAL ASSEMBLY FOR POURED CONCRETE ON-SITE WASTE DISPOSAL SYSTEM COMPONENTS

RELATED APPLICATION

This application is a continuation-in-part of my copending application Ser. No. 046,461, filed May 4, 1987 now abandoned.

BACKGROUND AND SUMMARY OF INVENTION

This invention relates to a pipe seal assembly for use in on-site waste disposal systems, such as in a septic system having a poured concrete septic tank, drop box or distribution box.

These tanks and boxes are box-shape structures constructed of concrete and have plural openings for the receipt of outlet and inlet pipes. Depending upon the particular arrangement, a number of pipes may be employed at one or more levels and the maximum number of openings are usually provided in the box. In certain prior constructions, the openings were simply holes formed in the box's side walls. More recently, these openings may be initially closed by seal assemblies and those openings for which pipes are intended have a removable portion of the seal assembly removed. The remaining part of the seal assembly is adapted to provide a water-tight seal for the inserted pipe.

A problem has arisen with respect to seal assemblies where flowing concrete has interfered with the seal to be developed with the pipe. Additionally, another disadvantage of known seals which mount on form mandrels is that they must be manually held in place while the form is open before casting, until such time as the form is closed; otherwise the seals simply fall off the mandrels.

The problems are avoided by the instant invention. More particularly, the instant invention provides for a releasably retained knock-out plug positioned adjacent the end of the seal assembly and, when the seal assembly is cast in place in the concrete box, the plug is located near the interior wall of the box. A specially configured mandrel supported on the form wall operates to releasably hold the seal and plug in place during casting of the box. The mandrel can include gripper structure for frictionally holding the seal in place, or can include undercut structure for gripping the seal. Additionally, the present seals' cylindrical body portion can be so dimensioned that the back of one seal can be placed over the front of another seal, such that a connected series of such seals mounted on only one mandrel can be used to seal a pipe through a thick poured concrete basement wall, for example.

Other objects and advantages of the invention may be seen in the details of the ensuing specification.

BRIEF DESCRIPTION OF THE DRAWINGS

The invention is explained in conjunction with the accompanying drawings, in which

FIG. 1-A is a side elevation view of the various parts of FIG. 1 in assembled form;

FIG. 2 is a diametral sectional view of the wall member portion of the seal assembly;

FIG. 3 is a diametral sectional view of the mandrel portion of the seal assembly;

FIG. 4 is an end elevational view of the mandrel of FIG. 3;

FIG. 5 is a diametral sectional view of the seal assembly with the parts in assembled condition;

DETAILED DESCRIPTION OF PREFERRED EMBODIMENTS

Figure 1A:
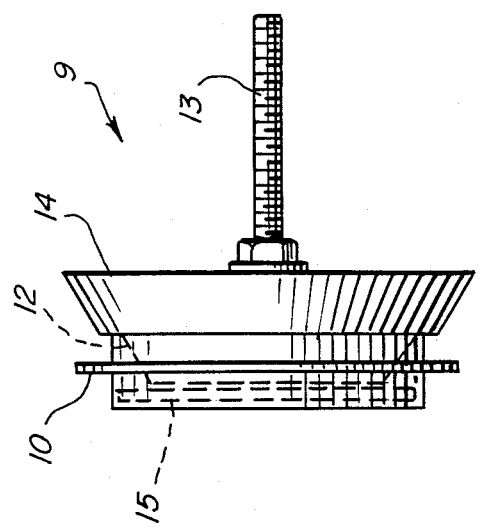
FIG. 1 is an exploded perspective view of the parts of the invented seal assembly.
Figure 1:
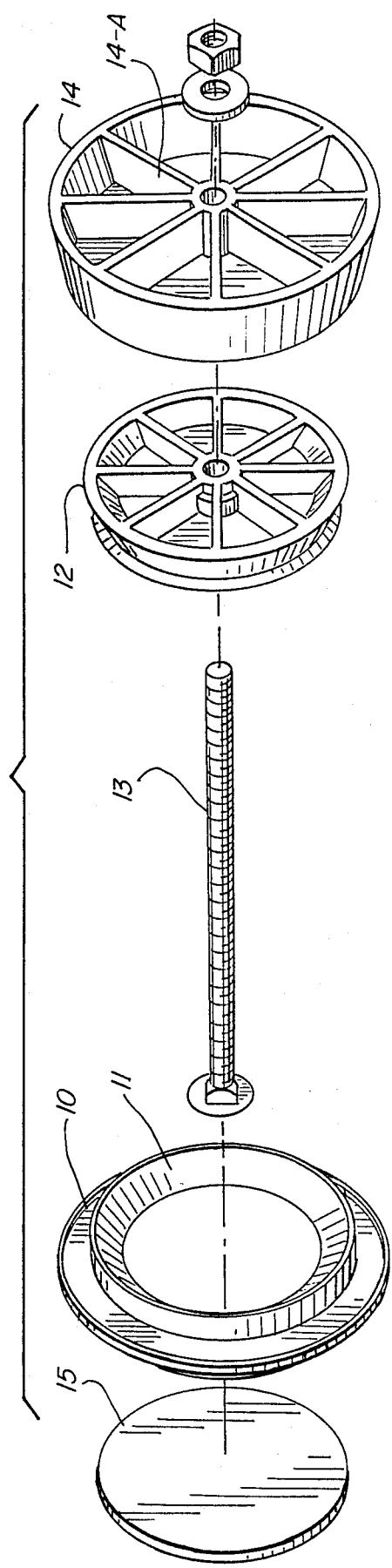

In the illustration given, wherein like reference numerals indicate corresponding elements, and with reference first to FIGS. 1 and 1-A, the numeral 9 designates generally the seal assembly of the instant invention. FIG. 1 also shows the parts in exploded perspective view with the numeral 10 generally designating the seal member and with numeral 11 designating a cylindrical seal wall member therefor. Mounted within the seal member 10 is a mandrel 12 which carries a mounting bolt 13, such as a carriage bolt with a square underhead, for example. A spacer member 14 having strengthening ribs 14-A may be optionally provided depending upon the thickness of the poured box wall in which the seal assembly 9 is to be cast. As the last discrete element of the seal assembly 9, a knock-out plug 15 is provided.

The basic installation is known. The seal assembly 9, in its tightly assembled condition shown in the lower half of FIG. 1, is attached by bolt 13 to the hinged jacket door (illustrated schematically as at 16 in the right hand portion of FIGS. 6 and 8) of a septic box concrete form (not shown in full) and with the jacket door 16 closed to its form-providing position. In that condition (see FIG. 8), the form is now ready for concrete to be poured which surrounds the seal member 10 in the fashion generally depicted in FIGS. 9 and 10 wherein the concrete is designated 17.

Referring now to FIG. 2, the seal member 10 is seen in greater detail. The seal member 10 has a first end 18 which is adapted to be positioned toward the exterior wall 17-A of the box as can be appreciated from FIGS. 7–10. The seal member 10 has a second end 19 which is adapted to be positioned adjacent the interior wall 17-B of the box formed by the concrete wall 17.

Figure 10:
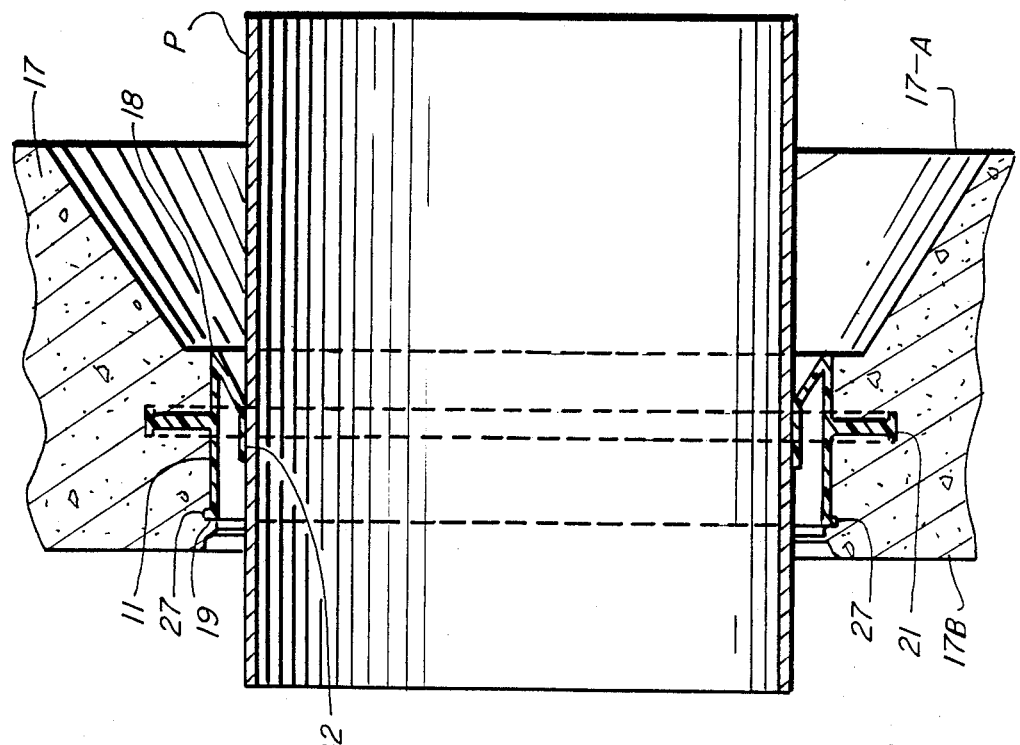
FIG. 10 is a fragmentary sectional view of the seal assembly with the mandrel and plug removed and with a pipe installed therein.
Figure 9:
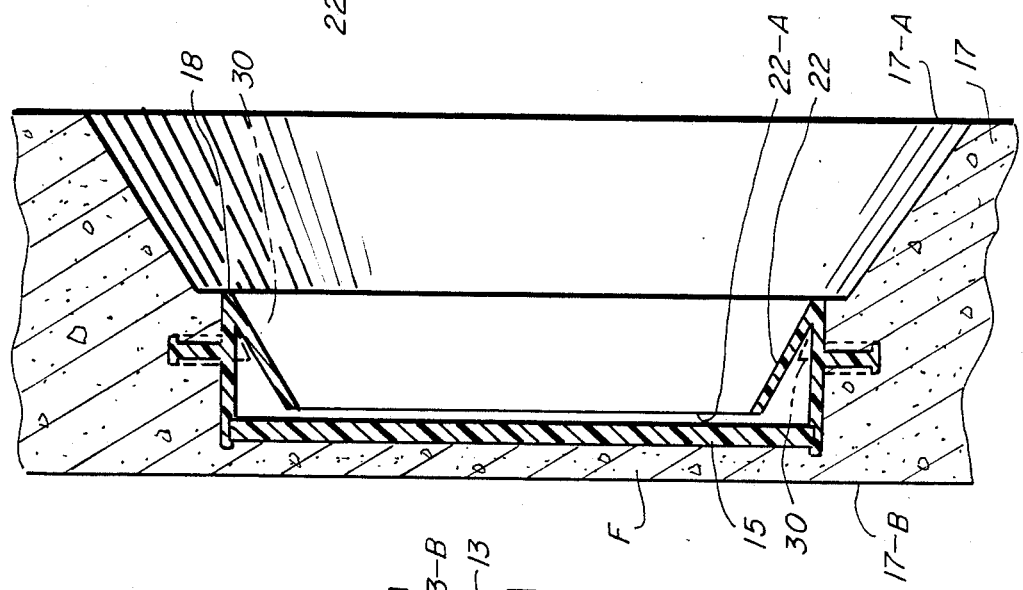
FIG. 9 is a fragmentary sectional view of the seal assembly shown cast in place prior to removal of the knock-out plug.

The seal member 10 has a main cylindrical wall member 11 with an outer cylindrical wall 11a and an inner cylindrical wall 11b. Projecting radially outward from the outer cylindrical wall 11a is an integral anchor flange 20—see FIG. 2—which is intended to become embedded in the concrete 17 and serve as an anchor as is best illustrated in FIGS. 9 and 10. The flange 20 at its periphery is equipped with a generally axially extending flange 21 which assists in developing the anchoring. The outer wall 11a may be provided with, if desired, an additional anchoring lip 27 (see FIG. 10).

The circumferentially extending inner wall 11b of seal member 10 at the first end 18 is equipped with an integral, relatively flexible, frusto-conical shaped flange member 22 which is angled toward the second end 19 but terminates short thereof. As can be best appreciated from FIG. 5, the flange member or reverse wiper blade 22 serves, in part, as a releasable keeper or retainer for a beveled retainer flange or undercut portion 23 provided on the interiorily facing end of the mandrel 12. The inner free end 22-A of flange 22 provides a circular opening along the axis of the seal member 10 into which the mandrel 12 and the undercut 23 is releasably received. The side wall 12A of mandrel 12 is preferably sloped generally inwardly (towards the undercut 23) at the same angle as wiper blade 22 of seal member 10. In addition the mandrel 12 has a generally spider webbed internal configuration (see webs indicated by reference letter "W" in FIG. 4) providing an axial opening as at 24 for the receipt of the retainer bolt 13—see FIGS. 4 and 6. The opening 24 includes an enlarged circular recess 24-A and a square-shaped recess 24-B which respectively receive the round head and square underhead of the retainer bolt 13. The bolt 13 also extends through the spacer element 14 and outer hinged form wall 16, which are also seen in FIG. 6, and receives a washer 13-A and a nut 13-B.

The circumferentially extending inner wall 11b at the second end thereof—as at 19—is equipped with a radially inwardly extending flange 25 which adjoins a recess 26 formed in wall 11b (see FIG. 2). Together the flange 25 and recess 26 cooperate to releasably retain the knock-out plug 15 in the fashion depicted in FIG. 5, i.e., in the space between the interior end of the mandrel 12 and the flange 25. Further, the outer peripheral edge (referenced by letter "T" in FIG. 6) of planar plug 15 can be tapered inwardly (as shown in FIG. 6), whereby the outer locking edge or corner (referred by letter "L" in FIG. 6) operates to form a better locking grip against flange 25 and recess 26. Moreover, such a tapered edge T on plug 15 also makes it easier to insert plug 15 into end 19 of seal member 10.

In certain instances the inner or second end 19 of seal member 10 preferably bears directly against the inner core wall 16A of the box form (see FIG. 8), such as desirably occurs when casting a plurality of seal assemblies 9 in the walls of a septic system distribution box (not shown), for example. In those instances there is no concrete flashing formed in front of the plug 15 due to the tight engagement of seal end 19 against form core wall 16-A. However, in other instances the inner end 19 of seal member 10 is purposely spaced somewhat from the form core wall 16-A, such as occurs when casting a plurality of seal assemblies 9 in the walls of a septic tank (see FIG. 9). In those situations a thin concrete flashing noted by reference letter "F" is formed in front of the knock-out plug 15.

Figure 6:
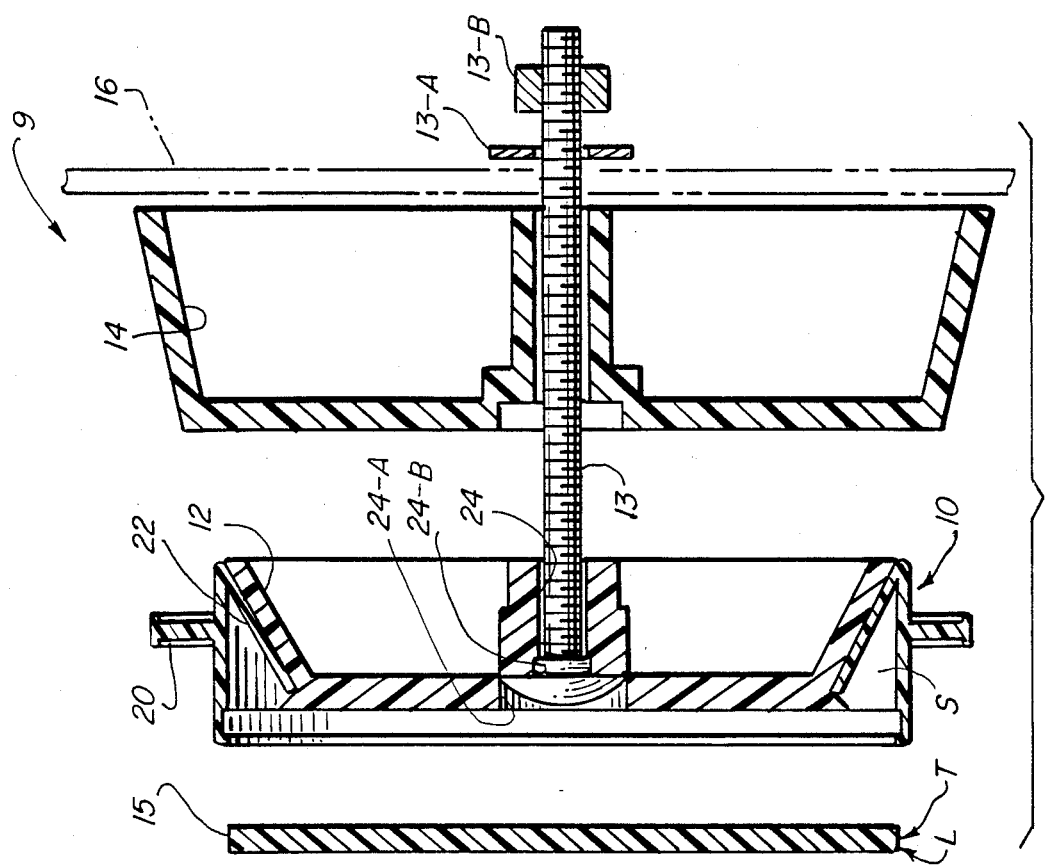
FIG. 6 is an exploded sectional view of the parts seen in FIG. 1, and with certain form portions shown in phantom.
Figure 8:
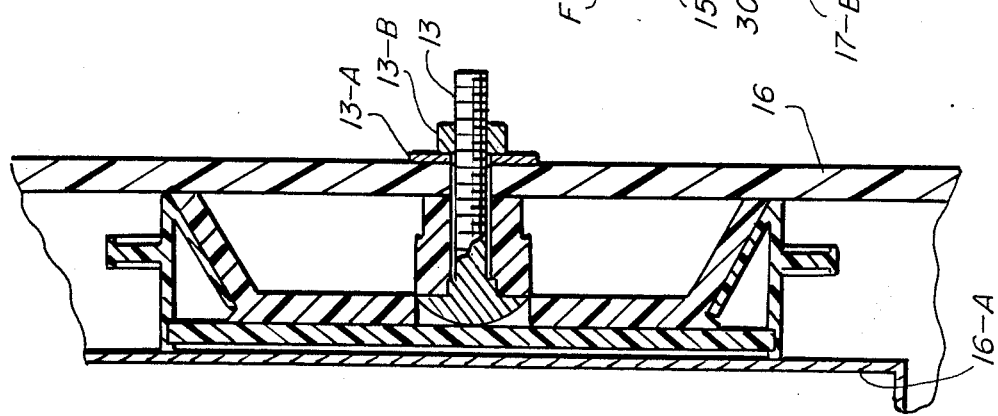
FIG. 8 is a sectional view of the present seal's components, similar to FIG. 6, but in assembled fashion and with additional form portions, ready to be cast in place.
Figure 13:
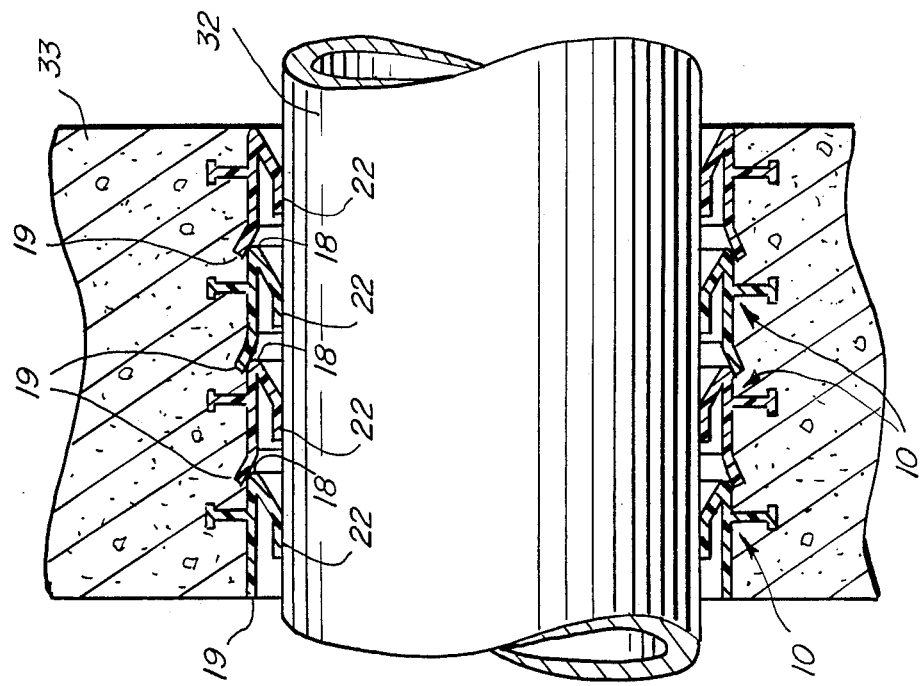
FIG. 13 is a sectional view of a connected series of the present seal assemblies, similar to FIG. 12, but with certain elements in reversed relationship.

In operation, the seal assembly 9, such as generally seen in FIGS. 6 and 8, is mounted within the box form by bolting the tightly assembled seal assembly 9 to the hinged form wall 16 with washer 13-A and nut 13-B. This mounting can be done at any desired height level on the box form wall 16. If required to be used in casting a particular type box, such as with septic tanks, for example, the spacer 14 can be of any desired thickness, such as for casting the seal assembly 9 in 2", 2½", 3", or even thicker walls. The spacer 14 can be deleted when thinner-walled boxes, such as 1½" or 1¾" thick distribution boxes or drop boxes, for example, are being cast with seal assembly 9. In any event, when the concrete 17 has been poured, the mandrel 12 and bolt 13 and any spacer 14 are removed, i.e., stripped out of seal member 10 when the jacket door 16 is hinged open. That is, the undercut 23 on mandrel 12 is released from the grip of the inner free end 22-A of flexible wiper blade 22.

However, the seal assembly 9 still provides the option of a pipe seal or a closure seal because of the mounting of plug 15 within the recess 26 of seal member 10. If a particular opening (which is developed in the concrete box wall 17 by using, i.e., casting in place, the seal assembly 9) is not to be used for a pipe, the plug 15 is left in place. In that instance, especially where a concrete flashing F is present, the flashing F and plug 15 cooperate to seal off the opening and maintain the box wall's integrity at that point. In actual practice, it has been found that the flashing F may force the plug 15 axially along seal wall 11b until plug 15 sealably bears against free end 22-A of wiper blade 22.

Even in those cases where the flashing F is not present, the plug member 15 becomes tightly sealed against the inner cylindrical wall 11b due to the shrinking forces of concrete wall 17 about outer cylindrical seal wall 11a adjacent the recess 26.

Figure 7:
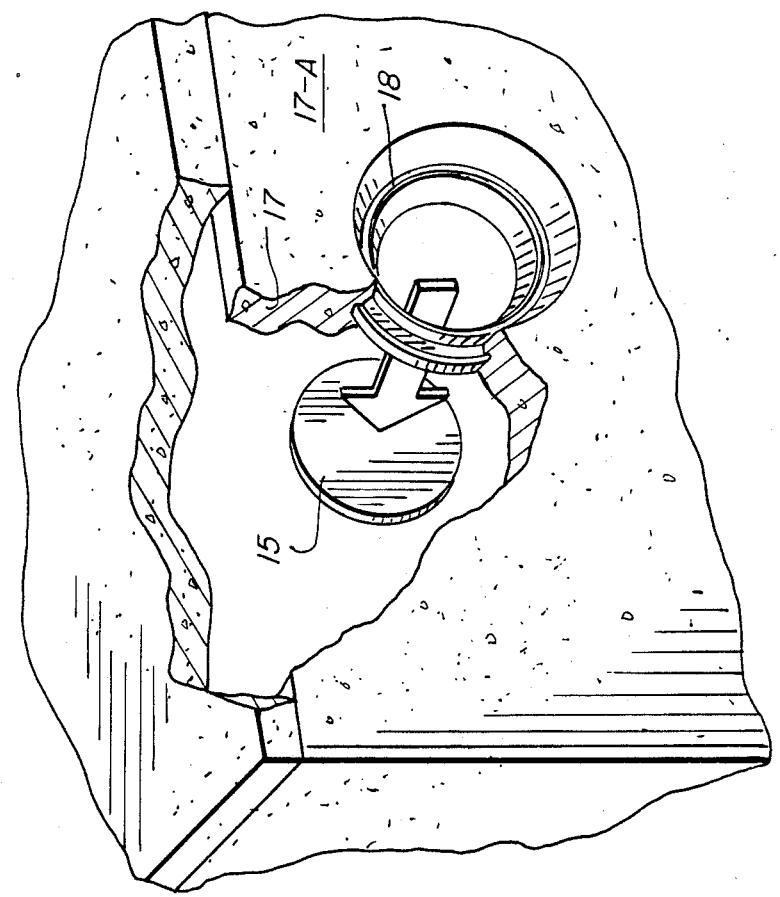
FIG. 7 is a fragmentary perspective view of the present seal assembly installed in a concrete box and with the plug shown in the stage of being removed.

On the other hand, if a pipe is to be installed in a particular opening (as indicated in FIG. 9), the plug 15 is removed as illustrated in FIG. 7. This can be done by using a hammer (not shown) to knock out the plug 15 and slug of concrete flashing F, if any. The pipe P is thereafter inserted in the seal member 10. That is, as illustrated in FIG. 9, the pipe P slides into the axial opening developed by the removal of the mandrel 12 and is tightly sealed by the flexible wiper blade 22.

Not only does the plug 15 provide a permanent seal in the event no pipe is to be installed but also serves to preclude the entry of fluid concrete within the seal member 10 during pouring of the box wall. Without the presence of the plug 15, concrete could enter in the space S (see FIG. 5) between the circumferential inner wall 11B and the wiper blade 22 and thereby prevent the necessary flexure, i.e., slightly stretched expansion, of the free end of blade 22 into its pipe-sealing configuration as shown in FIG. 9. Thus, it will be understood that because of the presence of separate plug 15, the second end 19 of the seal member 10 need not be forced against form core wall 16-A to successfully function in casting the seal assembly 9 in place, although such positioning can be done if desired in a given box casting operation. That is, the seal assembly of the present invention need only be mounted to the outer hinged form wall 16, rather than be accurately positioned between both form walls 16-A and 16 as was required with prior art designs.

Corrosion-resistant, durable and inert plastic-type materials are preferably used to form, such as by injection molding techniques, the various components of the seal assembly 9. In the preferred embodiment, the seal member 10 is made of linear low density polyethylene; it also could be formed of low density polyethylene.

The knock-out plug 15 is formed of high density polyethylene. The mandrel 12, primary because of the need for durability due to repetitive use in casting concrete boxes with seals made according to the present invention, is made of polypropylene. Alternatively, Nylon or so-called A.B.S. plastic materials could be used for the plug 15. The spacer 14 is also formed of polypropylene.

It will be understood that the opening formed by free end 22A of flexible wiper blade 22 is so sized as to sealably receive substantially all of the customary 4" drain pipes used in on-site waste disposal systems. Thus, the opening in seal member 10 of the preferred embodiment of the present invention is 3.850 inches in diameter; due to the seal's flexibility and stretchability it will fit so-called thin wall 4" P.V.C. (polyvinyl chloride) pipe, typified by pipe known as A.S.T.M. 27-29. Also, seal member 10 will accommodate so-called medium wall thickness 4" pipe, typified by A.S.T.M. 30-34 pipe, as well as heavy walled 4" pipe, such as Schedule 40 P.V.C. and 4" cast iron pipes.

If desired, a plurality of inwardly radially-extending, axially aligned gusset members 30 (shown in phantom in FIG. 9) can be formed on inner cylindrical wall 11b. The purpose for such gussets 30 is to provide additional strength and support to the wiper blade 22 when a pipe P inserted therein is forced down against the lower half of the wiper blade 22, such as when the backfill around the concrete box permits or forcibly causes the pipe P to settle downwardly. Thus, the gussets help prevent any undesirable gap to occur between the blade 22 and pipe P. Normally, these gussets (if additionally provided on the seal member 10, as desired) do not contact the wiper blade 22.

Figure 11:
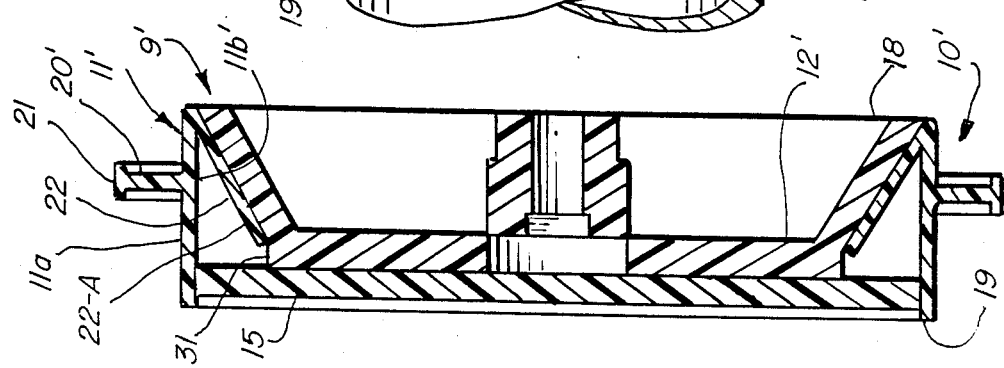
FIG. 11 is similar to FIG. 8, but depicting an alternate embodiment of the mandrel and wall member of the present seal assembly.

Another preferred embodiment of the present invention is shown in FIG. 11, which is similar to FIG. 8, and wherein like reference numerals indicate corresponding elements, except for modified elements for which the reference numerals bear a prime mark. In this additional preferred embodiment, wherein the modified seal assembly is generally denoted by reference numeral 9', the seal member 10' has a cylindrical seal wall member 11', a flexible, reverse-angled wiper blade 22, and an anchor flange 20 with flange 21. The inner cylindrical wall, designated by reference number 11b', is modified in that it is formed with a smooth-wall completely out to the second end 19 of seal member 10'. Thus, modified wall 11b' does not include any flange 25 or recess 26, such as present on inner wall 11b of seal member 10 (see FIG. 2).

A modified mandrel 12' is mounted within the seal member 10' and, although otherwise similar to mandrel 12, terminates in an interiorly-facing end 31 which is formed in an axially extending, cylindrical, smooth-walled fashion so as not to include any undercut portion 23 (like on mandrel 12, see FIG. 3). Importantly, the cylindrical end 31 of modified mandrel 12' is purposely dimensioned so as to be slightly larger in diameter than the inner free end 22-A of wiper blade 22. This is done so that a tight frictional securement of blade 22 on mandrel end 31 will occur when modified seal member 10' is mounted on the modified mandrel 12' during the casting process. That is, the wiper blade free end 22-A is slightly stretched over mandrel end 31 when assembled thereon, so that a tight frictional engagement occurs, which thus assures that the modified seal 10' will not become dislodged off modified mandrel 12' during the concrete casting process, yet can be readily stripped therefrom after the casting process has been completed.

It is additionally believed that a suction effect is created between the wall of the mandrel 12' and the wiper blade 22 which additionally assists in maintaining engagement between the same during casting.

Further, because of the fact that the poured concrete 17 presses against wall 11a, as well as against the plug 15 during the casting process, and thus forces plug 15 along modified inner seal wall 11b' against free end 22-A of wiper blade 22, it has been found that no inwardly-directed flange 25 or recess 26 is required to adequately secure plug 15 to the cylindrical wall 11' during casting.

In all other respects the modified seal assembly 9' utilizes the same components and operates in the same fashion as seal assembly 9.

Figure 12:
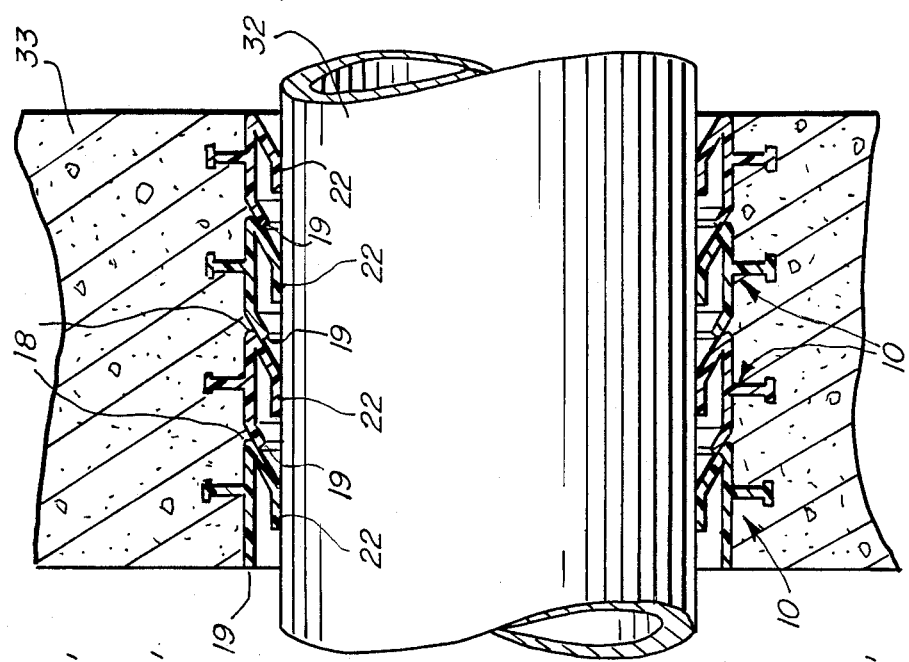
FIG. 12 is a sectional view of a connected series of the present seal assemblies, for use in sealing pipes through thick concrete wall sections.

Although described with reference to a pipe seal for an on-site waste disposal system, it will be understood that the seal assemblies 9 and 9' of the present invention readily lend themselves to sealing pipes and similar conduits in other concrete boxes, such as in utility pull boxes, or in residential basement walls where a sewer outlet line projects through the basement wall. For example, as seen in FIG. 12, to seal a sewer line 32 through a thick basement wall 33, a series of seal members 10 could be cast in place in such a wall in abutting front-to-back relationship. That is, the first seal 10 would be snap fitted, i.e., releasably retained, to the mandrel 12 (not shown in FIG. 12, but see FIG. 8), with a second seal member 10 having its end 18 inserted over (or inserted into, as desired) the opening of the first seal member 10 created by that seal member's other end 19. Thus, in continuous fashion, a number of seal members 10 could be so physically attached together until the innermost seal member 10 would be closed-off as described above with a seal plug 15 (not shown in FIG. 12, but see FIG. 5) or could be jammed against the outer form wall for the thick concrete wall 33. Thus, once cast in place, such a plurality of seal members 10 would provide a plurality of wiper blades 22, all in an aligned orientation, to sealably receive and support a sewer line 32 through a thick concrete basement wall 33.

Thus, while in the foregoing specification a detailed description of preferred embodiments of the present invention have been set down for the purpose of illustration, many variations in the details herein given may be made by those skilled in the art without departing from the spirit and scope of the invention.

We claim:

1. An improved seal apparatus for use in on-site waste disposal systems of the type having a poured concrete box member with sidewalls with a plurality of sidewall openings for receiving inlet and outlet lines extending therethrough, the seal apparatus being cast in place in the sidewalls of the poured concrete box member and comprising in combination:

a cylindrical seal wall member carrying an inwardly-directed, reverse-angled, flexible wiper member having a free end, said seal wall member also having a radially outwardly directed attachment member for casting in place within the sidewall of the poured concrete box member for securement thereto;

a seal plug member adapted when secured to the cylindrical seal wall member to seal off the internal diameter area of said cylindrical seal wall member and said wiper member from the entry of any unwanted substance;

a unitary mandrel member having a frusto-conical shaped outer wall conforming to the shape of said wiper member and terminating at one end in a gripper element for releasably gripping said free end of said wiper member from one side thereof so as to retainably secure said wiper member to said mandrel member without additional support means during the casting in place of said seal apparatus with the poured concrete box member, yet permit ready removal of said mandrel member from said wiper member after the casting process is completed; and said gripper element comprising a cylindrically-shaped member so dimensioned relative to the diametral opening of said free end of said wiper member as to create a tight frictional retention of said wiper member when said wiper member is placed over said mandrel member during the casting process.

2. The invention of claim 1, wherein said mandrel member has securement means carried thereby for permitting securement of both said mandrel member and said seal wall member releasably gripped to said mandrel member to a forming wall member during casting of the poured concrete box member.

3. The invention of claim 1, and including means formed on said cylindrical seal wall member for detachably securing said seal plug means to said cylindrical seal wall member.

4. The invention of claim 3, wherein said detachable securement means formed on the cylindrical seal wall member comprises a gripper flange and a recess.

5. The invention of claim 2, wherein said securement means comprises threaded fastener elements.

6. The invention of claim 1, and including a spacer member positioned adjacent said mandrel member for properly locating the seal apparatus with the sidewall of the poured concrete box member during casting thereof.

7. The invention of claim 1, wherein said seal plug member has a planar seal face.

8. The invention of claim 1, and including gusset members formed on said cylindrical seal wall member for supporting said wiper member when an outlet line is engaged with said seal apparatus.

9. The invention of claim 1, wherein a plurality of said seal wall members are connected together in abutting end-to-end fashion with an open end of each seal wall member being respectively supportably engaged to the opposite end of the next said seal wall member, whereby once said plurality of seal wall members are cast in place within a relatively thick poured concrete wall, the respective said wiper members of said plurality of connected seal wall members will sealingly receive a drain line through said poured concrete wall.

10. A pipe seal assembly to be cast in place within a poured concrete septic distribution box or the like comprising a cylindrical seal wall member having first and second ends and inner and outer wall surfaces, said first end being disposed adjacent the exterior of said poured concrete box and said inner wall surface at said first end being equipped with a radially inwardly extending integral wiper flange angularly inclined toward said second end and having a free end providing a mandrel receiving opening along the axis of said member, said outer wall surface between said ends being equipped with an integral, radially outwardly extending flange for anchoring the pipe seal assembly into the poured concrete box's wall during the casting thereof, a unitary cylindrically-shaped mandrel member releasably mounted in said opening and terminating a spaced distance from said second end, said mandrel member being equipped with a gripper element so dimensioned relative to said free end of said wiper flange as to releasably frictionally retain the free end of said wiper flange from one side thereof during casting in place of said wiper seal assembly to said poured concrete box, and a seal plug releasably retained within said second end of said seal wall member.

11. The seal assembly of claim 10, in which said radially outwardly extending flange is equipped further with a T-shaped flange.

* * * * *

UNITED STATES PATENT OFFICE
CERTIFICATE OF CORRECTION

PATENT NO. : 4,951,914

DATED : August 28, 1990

INVENTOR(S) : Meyers et al

It is certified that error appears in the above-identified patent and that said Letters Patent is hereby corrected as shown below:

In Claim 6, line 38, "with" should be --within--.

Signed and Sealed this

Seventeenth Day of December, 1991

Attest:

HARRY F. MANBECK, JR.

Attesting Officer

Commissioner of Patents and Trademarks